United States Patent Office 3,418,813
Patented Dec. 31, 1968

3,418,813
SEALING METHOD
Horace T. Dillon, Bay City, Mich., assignor to The Dow Chemical Company, Midland, Mich., a corporation of Delaware
No Drawing. Filed Nov. 3, 1965, Ser. No. 506,258
6 Claims. (Cl. 61—1)

ABSTRACT OF THE DISCLOSURE

A highly water-swellable polymer is dispersed into a body of water supported by an underlayer of soil subject to water seepage. The polymer has a gel capacity of at least 100 and reduces the water seepage. The treatment is also used for reducing subterranean water conduit leakage.

---

The present invention concerns a method for sealing soil and more particularly, it concerns a method for reducing the permeability of soil to water.

A number of techniques have been taught for reducing the permeability of soil to water. Such techniques include incorporating a chemical grout into the soil or laying a water impermeable coating on the surface of the soil. Examples of the former technique include the use of emulsified waxes as taught in U.S. Patent 3,094,809, the reaction of materials in situ within the soil to form water impermeable barriers as taught in U.S. Patent 2,801,984, and the use of certain inorganic water soluble materials such as gellable silicates. The coating techniques are illustrated by the laying of a water impermeable film or construction material over a surface to be sealed. Each of these methods, however, suffers from a serious disadvantage in that it is impossible, or at least inconvenient, to seal a soil surface which is in contact with or under a body of water.

Another technique for sealing soil is taught in U.S. Patent 3,016,713. The technique taught therein involves the use of a water-swellable clay employed conjunctively with a water-soluble polyelectrolyte. A water slurry of the clay and polyelectrolyte is applied to the surface of soil to provide an essentially continuous coating, which is alleged, as a result of the presence of the polymer, to be resistant to cracking upon weathering.

In addition to inoperability or inconvenience of technique, when the soil to be treated is in contact with a body of water, the foregoing soil sealing techniques are non-discriminatory with respect to the area of need. In other words, the entire soil surface is treated regardless of whether or not it presents a water passage of significance.

A technique has now been discovered which conveniently enables the sealing of a soil surface in contact with a body of water. Moreover, the method discriminates as to areas of need and thus, is particularly efficient as applied to soils wherein water permeable passages are comparatively infrequent, or as applied to soil surfaces which have been imperfectly treated with other types of soil sealants.

In particular, the method of the invention concerns reducing the permeability of a porous soil in contact with a body of water by incorporating a particulate, highly water-swellable polymer into water contacting the surface to be sealed. The polymer is highly swellable if it is characterized by a gel capacity of at least 100 in demineralized water. Gel capacity as used herein is defined as the number of grams of water absorbed by one gram of the polymer. This is measured by dispersing a known quantity of the polymer in an amount of water in excess of that required to completely swell the polymer, straining free water from the resulting dispersion and determining the gel/polymer mass ratio.

Upon introduction of the polymer into the water body in contact with, or to be contacted with, the soil surface to be treated, large numbers of discrete water swollen gels are formed in dispersion. Due to the fact the gels approximate the density of water, a uniform dispersion is readily formed throughout the entire body of water. As the water seeps through adjacent soil surface, the gels become lodged in the interstitial spaces of the soil. Ultimately passages permeable to water are plugged.

For most applications, the amount of polymer employed will not exceed about 1000 parts per million, based on the weight of the water. Normally, only a few parts per million, by weight of the polymer, will produce a useful sealing effect. Although it is not necessary, best results are achieved by using some form of agitation to produce a uniform dispersion of the polymer. In otherwise static water reservoirs, such agitation may be provided by mechanical stirrers or hydraulic pressure streams.

For the invention to produce best results, some portion of the water-swellable polymer used should be ground to a particle size smaller than 250 mesh of the United States Standard Screen Size Series. The smaller particle size insures penetration of smaller pores and deeper penetration of larger ones.

Useful water-swellable polymers can be obtained by any of several known preparative techniques. For instance, monoethylenically unsaturated monomers, of which at least a major proportion is water-soluble, are copolymerized with a polyunsaturated monomer by either mass, solution or emulsion polymerization methods to provide a lightly cross-linked polymer. To achieve a gel capacity in accordance with the invention, the amount of polyunsaturated cross-linking agent should not exceed about one mole percent of the monomer charge. Examples of a number of such polymers and methods for their preparation are taught in U.S. Patents 2,810,716, 3,016,713 and 3,021,269.

Preferred for use in the invention are water-swellable acrylic polymers. These are copolymers of water-soluble monomers having the general formula:

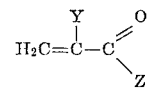

wherein Y is ethyl, methyl or hydrogen, Z is an amide group, an alkyl or dialkyl substituted amide group, wherein the alkyls may independently contain from 1 to 4 carbons, or an —OM group wherein M is an alkali metal or ammonium group. Examples of such monomers are acrylamide, methacrylamide, acrylic acid, sodium acrylate, potassium methacrylate and N-propyl acrylamide.

One or more of such monomers are copolymerized with a small amount of a cross-linking polyfunctional ethylenically unsaturated monomer. The amount of the cross-linker used may vary from 0.005 up to as much as 1 mole percent of the monomer charge to the polymerization system. Preferably, the amount of chemical cross-linker is within the range from 0.05 to 0.7 mole percent, of the charged monomer.

Illustrative of such polyfunctional monomers are methylenebisacrylamide, N,N-diallylacrylamide, diallylamine, diallylmaleate, ethylene glycol dimethacrylate, divinylbenzene, divinyl ether of diethylene glycol, trivinylbenzene, and the like materials having more than one polymerizable double bond.

In addition to chemical cross-linking, monoethylenically unsaturated, water-soluble monomers, or pre-existing linear polymers of such monomers, can be lightly cross-linked to prepare water-swellable polymers by suitable irradiation of the monomer, or polymer, as the case may be, in aqueous solution.

In a specific embodiment of the invention a soil excavation for the storage of water was treated. The excavation had been previously lined with an asphaltic material which had become badly cracked. The excavation had a capacity for approximately 850,000 gallons of water. The floor of the excavation was about 1,500 square yards. In carrying out the treatment of the invention, the water in the pond was caused to circulate by directing a high pressure stream of water down one side of the pond. Fifteen pounds of a finely ground, water-swellable acrylamide polymer passing a 270 mesh screen (U.S. Standard Series) was dispersed in the pond. After about ½ hour, five pounds of the same polymer composition having a larger average particle size passing a 70 mesh screen was added to the pond. After the final addition of the polymer, the agitation was continued for an additional fifteen minutes.

The polymer employed in the above treatment was prepared as a lightly cross-linked copolymer of acrylamide and methylenebisacrylamide, which copolymer was hydrolyzed to an extent that about 25% of the initially available carboxamide groups were replaced by sodium carboxylate groups. The polymer was characterized by a gel capacity greater than 500.

Initial control of water seepage was difficult to ascertain due to the continued useage of water from the pond. After one month, however, it was estimated that leakage from the pond had decreased by 70%. After five months, and during a period of no water usage from the pond, no leakage could be detected. The seal was considered to be 100% effective. There was still no measurable leakage after ten months.

In another embodiment of the invention, a water reservoir which had a mud bottom and mud walls was treated. The reservoir evidently was subject to slow "weeping" of the water throughout much of the surface instead of through isolated larger cracks as in the above situation. Fifty pounds of the same fine ground water-swellable acrylamide polymer and fifty pounds of the coarse ground polymer was dispersed throughout the reservoir which had a capacity for about 3.5 million gallons of water. After about 5 weeks, it was estimated water leakage from the reservoir had decreased by 50%.

The invention is also applicable to water moving in a subterranean water conduit. Illustratively, water-swellable polymer is incorporated into water flowing into an overloaded, or hydraulically pressurized, sewer line such as occurs during heavy rainfall. Leaks, throughout the course of the sewer line are effectively reduced after continuing treatment of the influent water with about 3 parts per million by weight of the water-swellable polymer for 6 hours.

Another application of the invention involves the treatment of open trenches utilized as water courses, such as for example, irrigation canals. The polymer is incorporated into such conduits at points up stream from the area to be treated. The amount of polymer used for this treatment may vary from about 0.1 up to 100 parts per million by weight of the influent water. After a period of at least about 5 minutes and up to as much as several hours depending upon velocity and volume of water, water seepage into the underlying soil is effectively decreased.

Essentially comparable results are achieved by substituting for the water-swellable acrylic amide used above any one or more of lightly cross-linked forms of alkali metal and ammonium polyacrylates, polystyrene sulfonates and polyvinyltoluene sulfonates. In addition, water-swellable non-ionic polymers such as lightly cross-linked polyvinyl alcohol, polyethylene oxide, poly-N-vinylpyrrolidone and poly-N-vinyloxazolidinone can be used provided they have a gel capacity of at least 100.

What is claimed is:

1. A method for treating an excavation containing a body of water to reduce water seepage into a soil underlayer which method comprises dispersing a highly water-swellable polymer into the body of water.

2. A method as in claim 1 wherein the water-swellable polymer is a lightly cross-linked acrylic polymer and has gel capacity of at least 100.

3. A method for reducing subterranean water conduit leakage which comprises incorporating to the conduit influent during a period in which there is hydrostatic pressure throughout the portion of the conduit line to be treated from about 1 up to about 1000 parts per million by weight of a highly water-swellable polymer having a gel capacity of at least 100.

4. A method as in claim 3 wherein the water-swellable polymer is a lightly cross-linked acrylic polymer.

5. A method for reducing water seepage into the soil underlayer of water courses which comprises incorporating into the flowing water from about 0.1 to about 100 parts per million by weight of a highly water-swellable polymer having a gel capacity of at least 100 whereby water seepage into the soil underlayer is decreased.

6. A method as in claim 5 wherein the water-swellable polymer is a lightly cross-linked acrylic polymer.

References Cited

UNITED STATES PATENTS

| 2,801,984 | 8/1957 | Morgan et al. | 166—33 X |
| 2,865,177 | 12/1958 | Gnaedinger | 61—36 |
| 3,056,757 | 10/1962 | Rakowitz | 166—33 X |
| 3,227,572 | 1/1966 | Rundle et al. | 61—36 X |
| 3,236,671 | 2/1966 | Dybalski et al. | 61—36 X |
| 3,298,982 | 1/1967 | Glenn et al. | 61—36 X |
| 3,302,717 | 2/1967 | West et al. | 166—33 |
| 3,124,934 | 1/1964 | Glenn et al. | |

FOREIGN PATENTS

| 932,726 | 7/1963 | Great Britain. |

EARL J. WITMER, *Primary Examiner.*

U.S. Cl. X.R.
61—36; 137—15